United States Patent [19]

Boniuk

[11] 3,963,330
[45] June 15, 1976

[54] APPARATUS FOR IMPROVING HUMAN VISUAL RESPONSE DURING CONDITIONS OF REDUCED AMBIENT ILLUMINATION

[76] Inventor: Vivien Boniuk, 200 E. End Ave., Apt. 1C, New York, N.Y. 10028

[22] Filed: Dec. 20, 1973

[21] Appl. No.: 401,815

[52] U.S. Cl. ............................. 351/163; 350/195; 350/311; 351/44
[51] Int. Cl.² ...................... G02C 7/10; G02B 5/28
[58] Field of Search ................ 351/44, 49, 163, 1; 350/1, 2, 195, 311, 147

[56] References Cited
UNITED STATES PATENTS
2,758,510   8/1956   Auwarter ............................ 351/163
2,964,427  12/1960   Rheinberger et al. ................. 350/2

OTHER PUBLICATIONS

"Spectral-Transmissive Properties & Use of Colored Eye-Protective Glasses" Circular of Nat. Bur. Stds. C421, June 1, 1938 Coblentz et al. pp. 13, 14 & 27.

"Color in Sunglass Lenses," Am. Jour. Optometry & Arch. Am. Acdy. of Optrometry, vol. 46, No. 11, Nov. 1969, Clark pp. 825 & 835.

*Primary Examiner*—Paul A. Sacher

[57] ABSTRACT

Apparatus for improving vision under conditions of relatively low intensity ambient illumination. An improved lens is of the concave meniscus type and has a total power in the range of between about 0.12 to 1.50 diopters. In addition, the lens is designed to attenuate radiation transmitted through it of wavelengths below about 5400 A. An anti-reflectant coating may also be provided on the rear surface of the lens to reduce glare.

8 Claims, 2 Drawing Figures

APPARATUS FOR IMPROVING HUMAN VISUAL RESPONSE DURING CONDITIONS OF REDUCED AMBIENT ILLUMINATION

This invention relates to a lens for improving human vision under conditions of relatively low intensity ambient illumination, and in particular to a novel spectacle lens.

Parallel light incident upon the cornea is focussed by a relaxed emmetropic or normal eye at the retina as a result of a combination of refractions in the cornea, lens and aqueous humor. Few eyes are completely normal in their ability to focus light exactly at the retina, however, and such defects as myopia, hyperopia and astigmatism are well known and commonly corrected by means of spectacle lenses of appropriate curvatures. An eye so corrected, for the purposes of this discussion is considered to be effectively emmetropic.

Even normal eyes, however, do not respond uniformly to all visual stimuli. The eye is a non-linear optical receiver and its sensitivity is a function of the spectral distribution and intensity of the incident light. Human vision is both photopic and scotopic; photopic vision is attributed to cone receptors and scotopic vision to rod receptors in the retina. The cone receptors provide a high degree of visual acuity and colour discrimination; whereas, the rod receptors provide low visual acuity and achromatic or colourless vision. However, scotopic vision is much more sensitive to incident light of low intensity than is photopic vision. High intensity light shining on the rod receptors causes a photochemical reaction to occur which renders the rod receptors virtually inoperative. After the eye has become accustomed to light of relatively strong intensity, temporary blindness occurs when the light to which the eye is exposed suddenly becomes dim. After a short period of time, by a process known as dark adaptation, the rod receptors begin to function and eventually the eye is able to respond to low intensity light stimuli.

Frequently the eye is subjected to ambient light of intermediate intensity, i.e. neither very strong nor very dim. This intermediate range is called the mesopic range, and under such conditions the eye exhibits characteristics that are generally intermediate to those of scotopic and photopic vision. Mesopic vision generally exists, for example, when driving at night and when viewing television in a semidarkened room.

Much data have been collected and analyzed regarding reduced visual acuity and other vision defects of the mesopic range, but the pathogenic mechanisms are not as yet well understood. Some of the defects are as follows.

Emmetropic eyes almost universally develop an induced myopia in conditions of decreased ambient illumination, to a measurable degree. This defect is frequently termed "empty space myopia", and also occurs whenever there is an absence of a visual frame of reference.

Visual acuity, as measured by the Vernier method, is strongly dependent on illumination. At 0.1 cd/meter$^2$, visual acuity increases as a linear function of the logarithm of illumination and approaches an upper limit at about 5–6 cd/meter$^2$.

The spectral distribution of the incident light, given spectral components of equivalent quanta, also affects Vernier acuity. In the mesopic range, a higher intensity of light in the violet range is required to achieve the same level of retinal response as that of light in the yellow range.

Glare, which is an eccentric light reflection, causes a veiling effect on the main or prime stimulus, which adversely affects perception and the ability of the individual to perform tasks in response to visual stimuli. In addition, in the mesopic range, glare further increases the minimum differential increase in stimulus which can be detected, related to the whole stimulus. As a result, the glare effect noted in night driving is a significant cause of fatigue and decreased effective visual response. The state of dark adaptation is not significantly altered by glare, as the duration of each stimulus is not long enough to produce any significant light adaptation.

An object of the present invention is to improve the vision of the eye during conditions of relatively low intensity ambient illumination, and thereby to reduce eye strain under such conditions.

According to the present invention, a spectacle lens is formed with a number of special corrections, both geometrical and spectral, in order to improve vision under conditions of relatively low intensity ambient illumination.

The invention will be better understood by reference to the accompanying drawings, in which.

Figure 1:
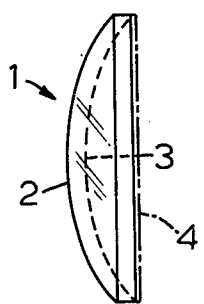
FIG. 1 is a side view of a spectacle lens in accordance with the invention.

Referring to FIG. 1, the lens of the present invention is generally denoted 1 and is of the concave meniscus type, and its front and rear surfaces 2, 3, respectively are ground so that the reciprocal of the focal length of the lens in meters is in the range of between about 0.12 to 1.5. A preferred value for most emmetropic eyes for average mesopic conditions of adaptation is 0.75. This correction has been found to provide adequate compensation for empty space myopia exhibited by most emmetropic eyes during typical night driving conditions, for example.

In addition to the above geometrical characteristics, the lens 1 of the present invention is formed integrally with an optical filter that is spectrally selective, i.e. partial absorption occurs in the lens of light of predetermined wavelengths. It has been found that optimum results are achieved by attenuation of wavelengths below about 5000–5500 A with longer wavelengths in the visible range (preferably 5400 A) transmitted with relatively little attenuation. The transmission of the filter should preferably be at least about eighty per cent (80%) for light of wavelengths above about 5400 A in the visible range. The attenuation of the filter below 5400 A should be such that the transmission of the filter is about 50 per cent (50%) at about 4500 A, and about twenty per cent (20%) at about 4000 A. The filter may be produced by any conventional means.

A lens having the geometrical and spectral characteristics referred to above, substantially reduces eye strain noticed by persons having effectively emmetropic eyes when the eyes are required to function for prolonged periods of time under conditions of relatively low intensity ambient illumination. An additional improvement may be achieved by applying an interference coating, indicated in ghost outline at 4 in FIG. 1, to the rear surface of the lens, the thickness and refractive index of the coating being such as to cause destructive interference of light of a predetermined wavelength range reflected from the rear surface of the lens while still allowing maximum transmission of light. For optimum results, the wavelength range of the transmitted light should coincide with the range of optimum retinal sensitivity, e.g. between about 5000–5500 A.

In some cases it may be desirable to construct the lens of a polarizing material having a vertical transmission characteristic. However, the use of polarizing materials usually diminishes the light throughput of the lens and hence the usage of such material is not recommended when it is desirable for the lens to have maximum light transmission.

The lenses of the present invention may be constructed of conventional optical materials, such as glass and synthetic resins of the kind commonly employed in the lens art.

It will be understood that lenses made in accordance with the present invention may be produced at relatively low unit cost by injection moulding, using any conventional synthetic resin having suitable optical properties. Also, the lenses may incorporate such conventional features as base in prisms and/or outward decentration of variable degree.

Figure 2:
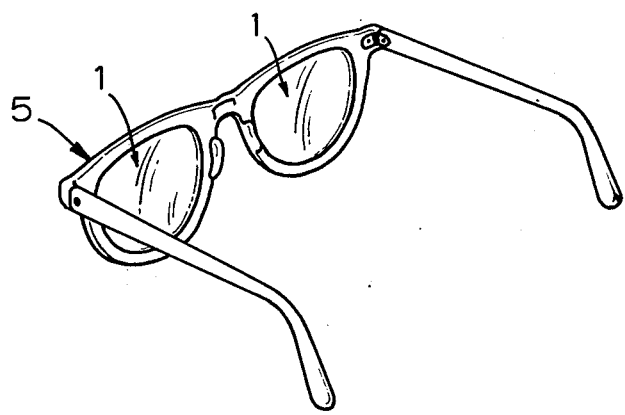
FIG. 2 is a perspective view of a pair of spectacles having lenses of the type shown in FIG. 1.

FIG. 2 shows a conventional pair of spectacles denoted 5, fitted with a pair of lenses 1 of the type shown in FIG. 1.

In order to determine the optimum lens for a person under conditions of relatively low intensity ambient illumination, the following method may be employed. First, the eyes are refracted in the non-accomodative state either with or without cycloplegics and with a level of illumination such that the eyes are in the photopic state. Coated filters of the kind described above which attenuate light below about 5000–5500 A (preferably 5400 A) are placed in front of the trial lenses selected during the first refraction step (hereinafter called the first trial lenses) or trial lenses of similar power to the first trial lenses and which incorporate the above described filters are substituted for the first trial lenses. The ambient illumination is reduced so that the eyes are in the mesopic state, and the person again is refracted, this time adding a minus correction in the range between about 0.12 and 1.50 diopters, until the vision of the person is at least equal to the optimum condition achieved during the first refraction step, i.e. at least about 20:20.

What I claim is:

1. A lens for improving the vision of persons having eyes essentially correctible to the emmetropic state under conditions of relatively low intensity ambient illumination, said lens having curved front and rear surfaces, the sum of the powers of said surfaces being in the range of between about minus 0.12 to 1.50 diopters, and said lens having filter means integral therewith for attenuating radiation transmitted through said lens of wavelengths below about 5000–5500 A.

2. A lens as claimed in claim 1 wherein the light transmission of said filter means is at least about eighty per cent for wavelengths higher than 5400 A in the visible range, wherein the transmission of said filter means is about fifty per cent at about 4500 A and about 20 per cent at about 4000 A, and wherein said sum is minus 0.75.

3. A lens as claimed in claim 1 wherein said lens has an interference coating on said rear lens surface, the thickness and refractive index of said coating being such as to cause destructive interference of light reflected from said rear surface, said reflected light being of a predetermined wavelength in the range between about 5000–5500 A.

4. A lens as claimed in claim 1 wherein said lens includes polarizing material having a vertical direction of transmission.

5. In combination, an eye glass frame and a pair of spectacle lenses supported by said frame for improving the vision of persons having eyes essentially correctible to the emmetropic state, said lenses each having curved front and rear surfaces, the sum of the powers of said surfaces being in the range of between about minus 0.12 to 1.50 diopters, and said lens having filter means integral therewith for attenuating radiation transmitted through said lens of wavelengths below about 5400 A.

6. The invention claimed in claim 5 wherein the light transmission of said filter means is at least about eighty per cent for wavelengths higher than 5400 A in the visible range, wherein the transmission of said filter means is about fifty per cent at about 4500 A and about twenty per cent at about 4000 A, and wherein said sum is minus 0.75.

7. The invention claimed in claim 5 wherein each lens has an interference coating on its rear surface, the thickness and refractive index of said coating being such as to cause destructive interference of light reflected from said rear surface, said reflected light being of a predetermined wavelength in the range between about 5000–5500 A.

8. The invention claimed in claim 5 wherein said lenses each include polarizing material having a vertical direction of transmission.

* * * * *